United States Patent [19]

Sénès et al.

[11] 4,071,472

[45] Jan. 31, 1978

[54] CATALYST FOR THE PURIFICATION OF EFFLUENT GASES CONTAINING OXIDES OF NITROGEN AS IMPURITY

[75] Inventors: Michel Sénès, La Baule; Yannick Le Goff; Jean-François Gourdier, both of Saint Nazaire, all of France

[73] Assignee: Societe Chimique de la Grande Paroisse, Azote et Produits Chimiques, Paris, France

[21] Appl. No.: 653,831

[22] Filed: Jan. 30, 1976

[30] Foreign Application Priority Data

Feb. 4, 1975 France .............................. 75 03430

[51] Int. Cl.$^2$ ..................... B01J 21/04; B01J 21/12; B01J 23/10; B01J 23/74

[52] U.S. Cl. ............................. 252/455 R; 252/462; 423/239

[58] Field of Search ..................... 252/462, 455 R; 423/213.2, 213.5, 239

[56] References Cited

U.S. PATENT DOCUMENTS

| 3,483,138 | 12/1969 | Stephens | 252/462 |
|---|---|---|---|
| 3,615,166 | 10/1971 | Hindin et al. | 252/462 X |
| 3,857,921 | 12/1974 | Tamura et al. | 252/466 J |
| 3,956,188 | 5/1976 | Hindin et al. | 252/462 |

*Primary Examiner*—W. J. Shine
*Attorney, Agent, or Firm*—Browdy and Neimark

[57] ABSTRACT

The invention relates to the purification of gaseous effluents containing oxides of nitrogen by reduction of said oxides in the presence of a catalyst at raised temperatures.

The catalysts used in this process contain iron as a major constituent, and may contain chromium or vanadium: these constitute 96 to 99.5% of the weight of the catalyst. Also present as promoters, in a total amount of 4.0 to 0.5% by weight of the catalyst, are one or more rare earth metal oxides and a trace quantity of a platinum metal. The catalyst is prepared by a method which ensures a specific surface of 20–100 m$^2$/g and pores having a maximum dimension between 100 and 5000 A.

Such a catalyst is particularly suitable for removing residual oxides of nitrogen from the gaseous effluent obtained in the production of nitric acid by the oxidation of ammonia.

10 Claims, 1 Drawing Figure

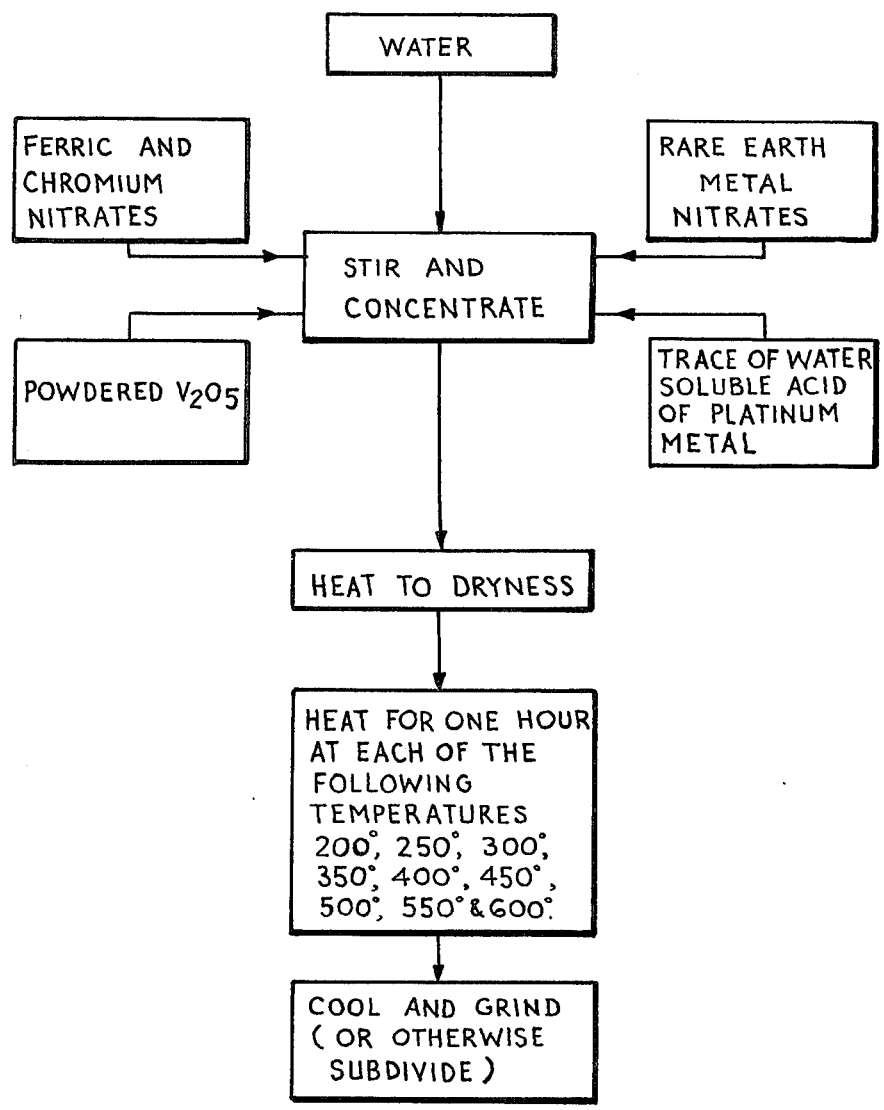

CATALYST FOR THE PURIFICATION OF EFFLUENT GASES CONTAINING OXIDES OF NITROGEN AS IMPURITY

This invention relates to the removal of oxides of nitrogen from gaseous effluents containing the same.

BACKGROUND TO THE INVENTION

In order to reduce industrial pollution, it is necessary to have available processes and products for removing toxic waste products, such as the oxides of nitrogen which are produced in processes of combustion of all kinds.

One of the classical methods for the removal of this kind of impurity consists in reducing the oxides of nitrogen. The reaction takes place in the presence of catalysts the active areas of which may be formed from platinum metals and the metal oxides conventionally used for catalytic oxidation.

The reducing gas may be taken from any convenient source. In the case of plants which produce nitric acid by the catalytic oxidation of ammonia, since the starting material is ammonia, this can serve as a readily available source of reducing gas.

In heterogeneous catalysis it is well known that it is not enough merely to use active materials which initiate the various kinds of chemical reactions such as oxidation, hydrogenation and cracking but that in fact it is necessary to carry out the reaction in the most economically possible manner.

Industry is, therefore, seeking a catalyst which exhibits the greatest possible activity, that is to say a catalyst which can be used in small volume, a reactor of small dimensions and very much improved conditions of operation during the reduction of oxides of nitrogen, namely: a low temperature, a high throughput of effluent gases through the reactor, a high conversion and improved selectivity. It is also desirable to have a catalyst the useful life of which is compatible with the economics of the process.

Success in meeting these requirements depends upon the way in which the active areas of a solid catalyst participate in the reaction. More especially, the structure of the solid catalyst, its structure and the promoters present are, for a given catalyst, factors of great importance.

Catalysts having active areas which consist of platinum metals which ar prepared by processes involving impregnating or exchanging the platinum have a heterogenous structure constituted by the support upon which the platinum is distributed, and this results in an irregular distribution of the active areas and consequently in a limited effectiveness. Moreover, these catalysts are obtained from rare and expensive metals.

DETAILED DESCRIPTION OF THE INVENTION

The present invention is based upon the fact that there have now been found catalysts which are more active than the known catalysts in consequence of their having carefully selected promoters present in their structure, and the use of a process of producing such catalysts which enables the promoters to be very uniformly dispersed throughout the crystal lattice of the catalyst.

These new catalyst compositions enable oxides of nitrogen to be removed with efficiencies greater than 99%, in reduction processes which are carried out at high volume ratios.

The method for the production of the catalyst compositions of the invention is one which is rendered effective and economical by virtue of the activity of the catalysts, the moderate cost of producing them, their long life, and the fact that large volumes of polluted gases can be quickly processed. Furthermore, the catalyst compositions are active for removing any concentration of oxides of nitrogen from gases even at concentrations which may be as great as 20,000 volumes per million. The compositions are also very effective in removing low concentrations of oxides of nitrogen between 10 and 200 v.p.m.

As active components the catalyst compositions of the invention contain iron, chromium and vanadium, in oxide form, either separately or in admixture, in quantities of between 96 and 99.5% by weight. The specific surface of these catalyst compositions is between 20 and 100 m$^2$/g, and the dimensions of the pores of the catalyst are between 20 and 5000 A. The iron is preferably in the trivalent form and the chromium in the trivalent or tetravalent form.

It has been found that the most favourable catalyst structure involves a specific surface between 20 and 100 m$^2$/g, preferably of about 70 m$^2$/g, and having a maximum pore dimension between 100 and 5000A and preferably having at least 40% of the pores with a maximum dimension, between 800 and 1200A.

In addition, it has been found preferable to have promoters in the present catalysts of the invention. Oxides of the rare earth metals, and in particular of cerium, lanthanum and neodymium, in proportions of between 0.5 and 4% by weight, and preferably approximately 1.5% by weight, are the preferred promoters for addition to the active ingredients.

Platinum metals in trace concentrations, that is to say in quantities of from 0.001 to 0.0001% by weight of metal, may advantageously be added to the other components of the catalyst composition. It has been discovered that at these very low concentrations the platinum metals act as electron promoters.

The structure of the catalyst compositions which has a very special bearing upon the favourable properties thereof is secured by employing a particular method of preparation, which is illustrated in the accompanying flow diagram.

The catalyst compositions of the invention are obtained by the controlled decomposition of solutions of the nitrates of the active ingredients in a temperature progression starting at 200° C and ending at 600° C and proceding by 50° C steps, with the temperature in each step being maintained for approximately 1 hour.

When one of the active ingredients is vanadium oxide it is introduced in the form of the pulverulent oxide $V_2O_5$ into a solution of iron or chromium nitrate or a mixture of these nitrates.

The platinum metal is introduced in the form of an acid thereof such as chloroplatinic acid.

In one embodiment of the invention the product obtained by thermal decomposition is ground prior to being formed into granules or rods.

In a second embodiment of the invention the catalyst material may be further processed by processes known per se in catalyst production. Thus the product obtained by thermal decomposition may be finely powdered, the powdered product then mixed with a clay binder or an alumina cement and the resulting mixture subjected to extrusion or compression to produce granules or compressed rods. The active materials may also be supported upon activated alumina.

The catalyst compositions of the invention may be used with great success in a method of purifying gases from oxides of nitrogen, in the presence of a reducing gas, at a temperature of between 120° and 350° C, at a minimal pressure, and with a volume ratio of flow (VRF) for the gases which may be high and may reach 80,000.

It is not necessary to use a specific reducing gas but hydrogen and ammonia are very suitable.

It has been found that increased pressure has a favourable effect on the activity of the catalysts. The process of reducing the oxides of nitrogen may advantageously take place at effective pressures of between 5 and 50 bars.

The method is suitable for purifying gaseous effluent containing any concentration of oxides of nitrogen. It is extremely effective, even at high concentrations of oxides of nitrogen of the order of 20,000 v.p.m., and is equally effective at low concentrations of the order of 10 to 200 v.p.m.

Purification process using the catalyst compositions of the present invention is particularly suitable for the purification of the residual gases which are fed into the atmosphere during the manufacture of nitric acid.

The following Examples illustrate the preparation of the catalyst compositions and their use.

EXAMPLE 1

454g. of ferric nitrate, 37g. of chromium nitrate and 7.6g. of cerium nitrate are mixed in aqueous solution. The solution of the mixture was decomposed by heating it to a temperature of 200° C, at which temperature it was held for 1 hour. The temperature was then raised progressively, in successive steps each of 50° C being held for a 1 hour period at each temperature up to a temperature of 600° C.

A catalyst is thus obtained the final composition of which is as follows:

| Catalyst 1 | $Fe_2O_3$ | 89.90% by weight |
|---|---|---|
|  | $Cr_2O_3$ | 7.10% by weight |
|  | $CeO_2$ | 3,000% by weight |

The product is then broken up into granules of between 3 and 25mm. diameter, the size depending upon the permissible drop in pressure in the reactor in which it was to be used. The specific surface of the product is between 60 and 75m$^2$/g. About 50% of the pores of the product have a maximum dimension of 1000 A.

EXAMPLE 2

522g of ferric nitrate and 4.8g. of lanthanium nitrate are mixed in aqueous solution and to the resulting solution there is added 14.6g. of vanadium oxide, $V_2O_5$, in the form of a powder have a fineness of 50 to 100 microns. The mixture is then decomposed by continuous stirring and by following the progressive and stepwise temperature-raising and holding procedure used in Example 1 until 600° C is reached.

The final composition of the product obtained is:

| Catalyst 2 | $Fe_2O_3$ | 86.3% by weight |
|---|---|---|
|  | $V_2O_5$ | 12.2% by weight |
|  | $La_2O_3$ | 1.5% by weight |

The specific surface of the product is 40 m$^2$/g and the porosity is such that 40% of the pores have a maximum dimension of 800A, the remainder having a dimension between 100 and 5000A.

EXAMPLE 3

494g of ferric nitrate, 5.7g of neodymium nitrate and 1ml of an aqueous solution of chloroplatinic acid containing 0.25g of platinum per litre of aqueous solution are admixed in aqueous solution. The resulting solution is decomposed by heating it, using the procedural steps described in Example 1 up to a temperature of 600° C.

The final composition of the product obtained is:

| Catalyst 3 | $Fe_2O_3$ | 97.8% by weight |
|---|---|---|
|  | $Nd_2O_3$ | 2.2% by weight |
|  | Pt | 0.00025% |

The specific surface of the product is 90m$^2$/g and the porosity is such that 60% of the pores have a maximum dimension of 1,200A.

EXAMPLE 4

A modified form of catalyst 1 is produced by preparing it for use by a conventional process used for catalyst production, viz:

The end product of Example 1 is ground to a 200 to 1000 micron powder. Approximately 15 to 30% of a clay or aluminous cement binder is then added thereto. The mixture is formed into a dough by mixing with water until the required consistency for extrusion is achieved. After extrusion the product obtained is dried for 12 hours at 200° C.

The dough may now be compressed and dried at 200° C for 3 hours and then granulated and formed into compressed tablets.

The specific surface obtained with catalyst 4 is 35m$^2$/g and the pores have a maximum dimension between 100 and 5000A.

EXAMPLE 5 (COMPARATIVE)

For purposes of comparison, a catalyst is prepared using the active ingredients of catalyst 1 but without promoters, using a conventional method of preparation.

Commercially available products are used viz. 90% by weight of ferric oxide $Fe_2O_3$ and 10% by weight of chromium oxide $Cr_2O_3$. After the powders have been mixed, the mixture is compressed to produce rods. The specific surface of catalyst 5 is 10m$^2$/g and the structure is such that 50% of the pores have a maximum dimension exceeding 5000A.

EXAMPLE 6

This example illustrates the use of the various catalysts described above and makes it possible to compare their effectiveness under absolutely identical conditions, using the effluent gases from an industrial nitric acid plant.

The results obtained are set out in Table I below.

The process of removing the oxides of nitrogen contained in ammonia is carried out at a pressure of 1 bar with the initial temperature of the gaseous mixture being 200° C. The volume ratio (VRF) is given by the volume of gas passed through the catalyst in standard litres per hour divided by the volume of the catalyst used in liters. The content of oxides of nitrogen $NO_x$ is expressed as v.p.m. (volumes per million). The $NO_x$ content of the gases fed to the catalyst, which are given in v.p.m., is set out in column II. The $NO_x$ content of the outflowing gases, which are given in v.p.m., is set out in column V. The quantity of ammonia introduced into the incoming mixture, which is given in moles $NH_3$/moles $NO_x$, is set out in column 3. The volume ratio VRF is set forth in column IV, pressures in effective bars (P eff. bars) in column V, and the temperature of the mixture fed to the catalyst in °C in column V.

TABLE I

| Catalyst | $NO_x$ in v.p.m. | moles $NH_3$/ moles $NO_x$ | VRF | P.eff bars | T° C input | $NO_x$ out v.p.m. |
|---|---|---|---|---|---|---|
| 1 | 1500 | 1.00 | 20,000 | 1 | 200 | 60 |
| 2 | 1500 | 1.00 | 20,000 | 1 | 200 | 80 |
| 3 | 1500 | 1.00 | 20,000 | 1 | 200 | 50 |
| 4 | 1500 | 1.00 | 20,000 | 1 | 200 | 90 |
| 5 | 1500 | 1.00 | 20,000 | 1 | 200 | 1150 |

For catalysts 1 to 4, the efficiencies of removal are between 94 and 96.66%.

Perusal of this table demonstrates the advantages of catalysts 1 to 4 which are in accordance with the invention, and which have an activity from 13 to 23 times greater than that of catalyst 5.

EXAMPLE 7

A second series of trials is carried out using effluent gases from an industrial nitric acid plant, which are at a higher pressure than the effluent gases used in Example 6. The results are given in Table II below.

TABLE II

| Catalyst | $NO_x$ in v.p.m. | Moles $NH_3$/ Moles $NO_x$ | VRF | P.eff bars | T° C input | $NO_x$ out v.p.m. |
|---|---|---|---|---|---|---|
| 1 | 1500 | 1.00 | 40,000 | 6 | 200 | 12 |
| 2 | 1500 | 1.00 | 40,000 | 6 | 200 | 15 |
| 3 | 1500 | 1.00 | 40,000 | 6 | 200 | 10 |
| 4 | 1500 | 1.00 | 40,000 | 6 | 200 | 17 |
| 5 | 1500 | 1.00 | 40,000 | 6 | 200 | 1110 |

The efficiencies of removal of catalysts 1 to 4 are of the order of 99% whilst that of catalyst 5 is very much lower.

Perusal of the results given in Column VII of this table shows that an increase in pressure to 6 bars effective coupled with a VRF doubled to 40,000 results in increased activity of the catalysts of the invention. A removal process which uses the catalysts according to the invention is considerably improved by increase of pressure of the input gases, whereas pressure has no effect on catalyst V when used under absolutely identical conditions.

EXAMPLE 8

The removal of oxides of nitrogen having concentrations, between 10 and 200 v.p.m. with high gas throughputs, at a pressure of 6 bars. A series of trails was conducted using catalysts 1 to 4 of the invention and with catalyst 5. The results are given in Table III.

TABLE III

| Catalyst | $NO_x$ in v.p.m. | Moles $NH_3$/ Moles $NO_x$ | VRF | P.eff bars | T° C input | $NO_x$ out V.P.M. |
|---|---|---|---|---|---|---|
| 1 | 50 | 0.90 | 20,000 | 6 | 200 | 5 |
| 2 | 50 | 0.90 | 20,000 | 6 | 200 | 6 |
| 3 | 50 | 0.90 | 20,000 | 6 | 200 | 4 |
| 4 | 50 | 0.90 | 20,000 | 6 | 200 | 8 |
| 5 | 50 | 0.90 | 20,000 | 6 | 200 | 50 |

Since the five trails were conducted under absolutely identical conditions, it can be seen from the table that by the purification of gases containing oxides of nitrogen by catalytic reduction using the catalysts of the invention it is possible to remove low concentrations of oxides of nitrogen even with considerable throughputs of gas. Catalyst 5 is wholly ineffective in removing these low concentrations of oxides of nitrogen. In addition, it was found during these trials that ammonia did not combine at all with the oxides of nitrogen to form nitrites.

We claim:

1. A catalyst for use in the removal of oxides of nitrogen from effluent gas consisting essentially of (a) 96–99.5% by weight of an oxide of at least one of the metals iron, chromium and vanadium, (b) a promoter selected from the group consisting of an oxide of at least one rare earth metal, present in an amount of 4–0.5% by weight, said catalyst having a specific surface within the range of 20–100 m²/gm and having the pores therein with a maximum dimension within the range of 100–5000 A, said catalyst being prepared by the thermal decomposition of an intimate mixture of the nitrate of at least one of the metals iron and chromium and, when vanadium is to be present, of vanadium pentoxide powder and a water-soluble form of one of the said promoters, said thermal decomposition taking place in a series of steps the first of which is effected at substantially 200° C for substantially 1 hour, each succeeding heating step taking place at a temperature substantially 50° C higher than the preceding step and lasting substantially 1 hour with the final heating step taking place at substantially 600° C and lasting substantially 1 hour.

2. A catalyst as claimed in claim 1 in which said rare earth metal is selected from the group consisting of cerium, lanthanum and neodymium.

3. A catalyst as claimed in claim 1 in which said oxide of at least one of said metals is ferric oxide.

4. A catalyst as claimed in claim 1 in which said oxide of at least one of said metals is $Cr_2O_3$.

5. A catalyst as claimed in claim 1 containing an additional promoter which is a platinum metal present in an amount of 0.001 to 0.0001%.

6. A catalyst as claimed in claim 1 in the form of a powder.

7. A catalyst as claimed in claim 5 in which said catalyst, obtained by thermal decomposition, is admixed in finely divided form with a binder selected from the group consisting of clay and alumina cement and said mixture subjected to extrusion or compression to form granules or compressed shaped members said granules or compressed shaped members being dried at about 200° C.

8. A catalyst as claimed in claim 1 in which at least 40% of the pores thereof have a maximum dimension within the range of 800 to 1200 A.

9. A catalyst in accordance with claim 1 wherein said oxide of at least one of said metals is a mixture of ferric oxide with $Cr_2O_3$ or $V_2O_5$; wherein at least 40% of the pores thereof have a maximum dimension within the range of 800 to 1200 A; and said catalyst further containing an additional promoter which is a platinum metal present in an amount of 0.001 to 0.0001%.

10. A catalyst as claimed in claim 1 in which said catalyst obtained by thermal decomposition is supported on activated alumina.

* * * * *